United States Patent [19]

Mostert

[11] 4,038,823
[45] Aug. 2, 1977

[54] METHOD OF BLEEDING A HYDRAULIC SYSTEM AND MEANS THEREFOR

[75] Inventor: Jacob Johan Mostert, Muldersdrift, South Africa

[73] Assignee: Reverse Injection Company (Proprietary) Limited, Johannesburg, South Africa

[21] Appl. No.: 624,457

[22] Filed: Oct. 21, 1975

[30] Foreign Application Priority Data

Oct. 21, 1974 South Africa ............... 74/6675
Feb. 28, 1975 South Africa ............... 75/1285

[51] Int. Cl.² ............... F15B 7/10; B60T 11/30
[52] U.S. Cl. ............... 60/584; 188/352
[58] Field of Search ............... 60/584, 587; 188/352; 141/291, 382–386, 347, 349, 351

[56] References Cited

U.S. PATENT DOCUMENTS

| 2,064,573 | 12/1936 | Tatter | 188/352 X |
| 2,146,545 | 2/1939 | Leighton | 188/352 X |
| 2,209,784 | 7/1940 | Maack et al. | 188/352 |
| 2,256,516 | 9/1941 | Carlin | 188/352 X |
| 2,430,954 | 11/1947 | Schnell | 60/584 X |
| 2,431,210 | 11/1947 | Tamm et al. | 60/584 |
| 2,645,314 | 7/1953 | Lackinger | 188/352 |
| 2,827,930 | 3/1958 | Seegrist | 141/292 |
| 3,192,971 | 7/1965 | Kanamara | 141/291 X |

FOREIGN PATENT DOCUMENTS 806,972  1/1959  United Kingdom ............... 188/352

Primary Examiner—Edgar W. Geoghegan
Attorney, Agent, or Firm—Karl W. Flocks

[57] ABSTRACT

Hydraulic systems comprising master and servo cylinder assemblies are sometimes bled only with difficulty, and even then not effectively.

The invention provides a method of bleeding such systems, which involves the introduction of hydraulic fluid into the servo cylinder via a hydraulic connector having a fluid feed passage and a non-return valve therein. The fluid passes from the servo cylinder into the master cylinder. The hydraulic connector has engaging means for engaging with a connecting member of a hydraulic fluid feed line. A removable dust cap co-operates with the engaging means to seal off the passage and to protect it against dust and foreign matter when the engaging means is not connected to the connecting member.

12 Claims, 6 Drawing Figures

METHOD OF BLEEDING A HYDRAULIC SYSTEM AND MEANS THEREFOR

THIS INVENTION relates to a method of bleeding a hydraulic system, and to means therefor. It relates in particular to a method of bleeding a hydraulic system, making use of a master cylinder and piston assembly, a servo cylinder and piston assembly, and a hydraulic line connecting the master cylinder to the servo cylinder for operatively conducting hydraulic fluid between them.

By the term 'bleeding' is to be understood the removal of air or dirt from the hydraulic system, or charging, purging, or flushing the system with a clear, uncontaminated hydraulic fluid, i.e., hydraulic fluid which is free of substances which can impair the proper operation of the system, e.g., dirt, air, or the like.

In conventional hydraulic brake systems known to the applicant, closable bleed openings are provided at high points in the systems, i.e., at the upper regions of the servo cylinders. Closability is provided by screw-threaded bleed nipples adapted to screw into screw-threaded sockets to close off the bleed openings.

Bleeding of such systems takes place by opening the bleed opening, unscrewing the bleed nipple, and by pumping hydraulic fluid by means of the piston in the master cylinder, thereby expelling air from the servo cylinder, and by then closing the bleed opening by screwing the bleed nipple home. A disadvantage of this system of bleeding is that one person is needed to operate the master piston to pump hydraulic fluid from the master cylinder through to the servo cylinder, and another person is required to watch the bleed opening and to close it off as soon as air stops issuing from it. The master cylinder then has to be charged again with hydraulic fluid to the appropriate level. Bleeding carried out in this fashion is often not fully effective, because it is not always possible to bleed all the air out of such systems in this fashion.

It is an object of this invention to provide a method of bleeding hydraulic systems which is more effective than the method presently known to the applicant.

According to the invention, in an hydraulic system comprising a master cylinder and piston assembly, a servo cylinder and piston assembly, and a hydraulic line connecting the master cylinder to the servo cylinder for operatively conducting hydraulic fluid between the cylinders, there is provided a method of bleeding the system, the method including the step of introducing hydraulic fluid into the system along a closable feed passage to cause flow of hydraulic fluid along the feed passage through the servo cylinder and along the hydraulic line to the master cylinder.

More particularly, the introduction of the hydraulic fluid via the feed passage into the system, takes place from a hydraulic fluid feed line adapted for connection to the hydraulic system through a hydraulic connector, the method including the steps of providing a hydraulic fluid feed connecting member leading from the hydraulic fluid feed line; connecting the said connecting member to the hydraulic connector, the said connecting member defining a bleed chamber or being adapted to define a bleed chamber in co-operation with the hydraulic connector, and the bleed chamber having a closable bleed opening; feeding hydraulic fluid along the feed line until clear hydraulic fluid issues from the bleed opening; then closing the bleed opening; then introducing the hydraulic fluid into the hydraulic circuit via the feed passage; and then closing the feed passage.

Closability of the feed passage may be provided by a non-return value which is provided in the hydraulic connector.

The invention extends also to a servo cylinder assembly adapted for use in carrying out the method as described, and which includes a servo cylinder having hydraulic connecting means for connecting it operatively to a master cylinder; and a hydraulic connector defining at least part of a closable hyraulic fluid feed passage leading into the upper region of the cylinder and being connectable to a hydraulic fluid feed line.

Closability of the hydraulic fluid feed passage may be provided by having it in two parts, one part being in a screw-threaded nipple of the hydraulic connector, and the other part being at the end of a screw-threaded socket in the servo cylinder, the nipple engaging with the socket, and the parts of the passage being out of alignment such that the passage is closed when the nipple is fully engaged with the socket, but open when the nipple is less than fully engaged therewith.

Additionally or alternatively, closeability of the feed passage may be provided by a non-return valve located in the feed passage, preferably in the hydraulic connector.

The invention extends still further to a hydraulic connector having connecting means for connection to a connecting member of a hydraulic fluid feed line and having a hydraulic fluid feed passage therethrough, and which includes a non-return valve in the passage, and engaging means for engaging in such a fashion with the servo cylinder forming part of the assembly as described, that the hydraulic fluid feed passage of the connector can form at least part of the closable feed passage of the servo cylinder assembly when the servo cylinder and the hydraulic connector are in assembled relationship to form the assembly as described.

If desired, the hydraulic connector may be provided with a branch passage having an outlet and closing means operable to open and close the outlet, the branch passage leading out of the hydraulic fluid feed passage from a region downstream of the non-return valve. The non-return valve may be located at the end of the hydraulic fluid feed passage which is remote from the engaging means.

The invention extends also to a kit comprising a hydraulic fluid feed connecting member for a hydraulic fluid feed line, in combination with a hydraulic connector as above described, the said connecting means of the hydraulic connector being engageable with the said connecting member, and in association therewith being adapted to define a bleed chamber having a closable bleed opening.

The arrangement may be such that the bleed opening is open when there is incomplete engagement between the connecting means of the hydraulic connector and the said connecting member, and such that the bleed opening is closed when there is full engagement between them. The said hydraulic fluid feed connecting member may have a formation for unseating the non-return valve when there is full engagement between the hydraulic connector and the hydraulic fluid feed connecting member. It may also be provided with a biassed pin adapted to engage with the non-return valve when there if full engagement between the hydraulic connector and the hydraulic fluid feed connecting member, thereby to bias the valve to an unseated position.

The invention will now be described by way of example, as applied to a hydraulic brake system, with reference to the accompanying drawings.

Figure 1:
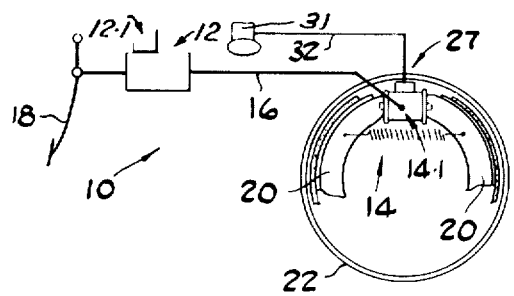
FIG. 1 shows schematically the hydraulic system for drum brakes for a vehicle, as modified in accordance with the invention, and when being bled in accordance therewith.

Referring to FIG. 1 of the drawings, reference numeral 10 refers generally to a hydraulic system for drum brakes for a motor vehicle. The system comprises a master cylinder and piston assembly 12, a servo cylinder and piston assembly 14, a hydraulic line 16 operatively connecting the assembly 12 hydraulically with the assembly 14 via hydraulic connecting means 14.1. The master piston and cylinder assembly is operable by a brake pedal 18. Operation of the master cylinder and piston assembly by the brake pedal 18 causes, by hydraulic action, displacement of the servo piston in the servo cylinder, and the operative displacement of the brake shoes 20 in the brake drum 22. The master cylinder 12 has a reservoir 12.1.

Figure 2:
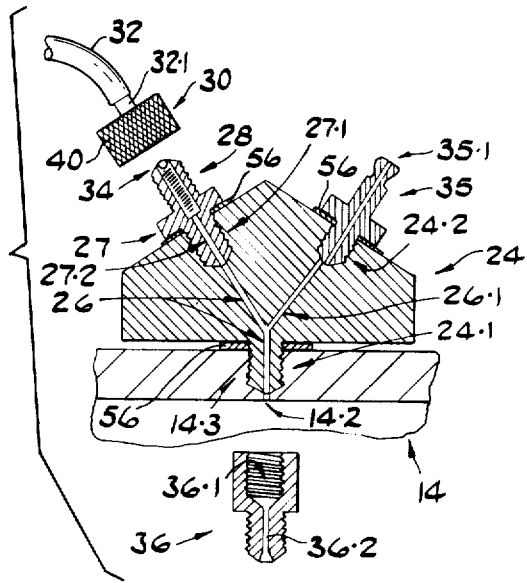
FIG. 2 shows a part-sectional diagrammatic side elevation of a kit used for the modification of the hydraulic brake system.
Figure 6:
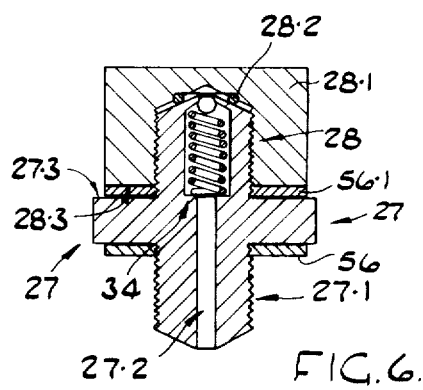
FIG. 6 shows a sectional side elevation of a hydraulic connector according to the invention.

According to the invention, a bleed nipple (not shown) is unscrewed from the screw-threaded socket 14.3 in the wall of a servo cylinder 14 and a hydraulic connector (see FIGS. 2 and 6) in the form of a nipple 27 having engaging means in the form of a screw-threaded part 27.1 and having a passage 27.2, and a non-return valve 34 in the passage is screwed into the socket 14.3. The non-return valve includes a ball 34.1 which is pressed against an internal valve seat by means of a spring 34.2. If desired, an adaptor a nipple 36 may be provided to accommodate different types of thread in the sockets 14.3 of bleed openings of cylinder 14. For each type of thread there will be provided an adaptor nipple 36 which is engageable with that thread and which has a socket 36.1 provided with a standard screw thread with which the screw threaded part 27.1 of the nipple 27 is engageable. The adaptor nipple has passage 36.2 therethrough. The nipple 27 has connecting means 28 adapted for connection to the connecting member 30 of a hydraulic fluid feed line 32. The non-return valve 34 serves to permit flow of hydraulic fluid along the hydraulic fluid feed passage through the nipple 27 into the servo cylinder 14, but prevents flow of fluid out of the cylinder via this passage. There is also provided a dust cap 28.1 engageable with the connecting means 28 to seal off the end of the nipple and hence of the passage 27.2. Sealing engagement between the dust cap 28.1 and the engaging means 28 of the nipple 27 is obtained by the sealing ring 28.2 retained in a groove in the dust cap and seating on the end of the connecting means 28. In order to ensure further sealing, there is provided a sealing washer 56.1 which is clamped between the machined faces 27.3 and 28.3.

The ring 28.2 may be of any material which is resilient and compatible with the hydraulic fluid being used. Thus, it may be of neoprene, nylon, or the like.

The washer 56.1 may be of the same materials but may also be of copper, aluminum, fibre, or the like.

Figure 3:
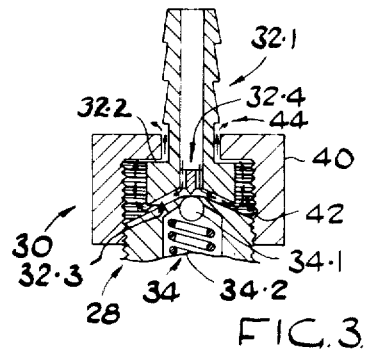
FIG. 3 shows a sectional side elevation of one form of connecting member forming part of the kit.

Referring now to FIG. 3 of the drawings, there is shown in part-sectional side elevation, details of the connecting member 30 of the hydraulic fluid feed line 32. The connecting member comprises a ring nut 40 which fits with clearance around the stem of the nipple member 32.1. The ring nut 40 engages with the connecting means 28 of the nipple 27. When the ring nut 40 is engaged with the connecting means 28 then there is defined a bleed chamber 42 between the ring nut 40 and the connecting means 28. When the ring nut 40 is less than fully engaged with the connecting means 28, the bleed chamber has an annular opening 44 and the nipple member 32.1 is disengaged from the end face of the connecting means 28. Hydraulic fluid can then flow from the fluid feed line 32 along the passage in the nipple member 32.1 into the bleed chamber 42, over a shoulder 32.2 of the nipple member 32.1, and out of the annular opening 44 around the stem of the nipple member 32.1.

In operation, in bleeding the system, the ring nut 40 will be less than fully engaged with the connecting means 28 thereby defining the bleed chamber and leaving it in communication with opening 44. Thereupon hydraulic fluid will be fed under pressure from pump 31 along the feed line 32, along the nipple member 32.1, and into the bleed chamber 42, and then over the shoulder 32.2 of the nipple member 32.1 and out of the annular opening 44. When clear hydraulic fluid issues from the opening 44, then the ring nut 40 is fully engaged with the connecting means 28. This causes the ring nut to bear down upon the shoulder 32.2 of the nipple member 32.1 and causes the frusto-conical face 32.3 of the nipple member to seat sealingly on the end of the connecting means 28 of the nipple 27. Further flow of clear hydraulic fluid along the fluid line 32 will then build up pressure and will displace the ball 34.1 of the non-return valve 34 from its seat where it has been held in position by the spring 34.2. Clear hydraulic fluid can then flow along the hydraulic fluid feed passage constituted by passage section 26 and 14.2 into the cylinder 14.

By way of development, the nipple member 32.1 may be provided with a formation 32.4, which is adapted to unseat the ball 34.1 from its seat when the ring nut 40 is fully engaged with the connecting means 28 and the frusto-conical face 32.3 seats sealingly on the end of the connecting means 28.

Figure 4:
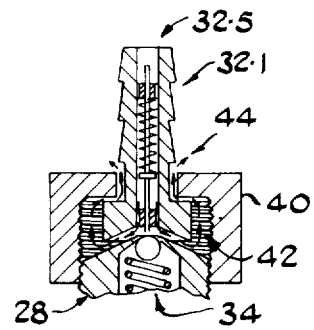
FIG. 4 shows a sectional side elevation of another form of connecting member forming part of the kit.

Referring now to FIG. 4 of the drawings, there is shown a modification of the connecting member of FIG. 3, the modification being that in the hollow stem of the nipple member 32.1, there is provided a spring biassed pin 32.5 which is adapted to engage with the ball 34.1 to bias the ball towards an open position when the ring nut 40 is fully engaged with the connecting means 28. When the ring nut 40 is fully engaged, the bias provided by the pin 32.5 is slightly less than that required to unseat the ball 34.1. The pin is therefore operative to reduce the pressure that would otherwise be required in the hydraulic feed line 32 to unseat the ball. However, the ball is not unseated when the ring nut 40 is fully engaged as is the case with the nipple member shown in FIG. 3.

In an alternative arrangement (see FIG. 2), the hydraulic connector may be of composite form being constituted by two parts, namely a base part 24 and the nipple 27. The passage 26 in the base part 24 together with the passage 27.2 through the nipple then constitute the closable hydraulic fluid feed passage forming an integer of the invention. The connecting means 28 of the nipple 27 is again connectable to the connecting member 30 of the hydraulic feed line 32. The base part is further provided with a branch passage 26.1 joining the passage 26 at a region downstream from the non-return valve 34. It has a screw-threaded portion 24.1 adapted to engage with the screw-threaded socket 14.3 in the wall of the cylinder 14. The base part 24 is further provided with a screw-threaded socket 24.2 communicating with the branch passage 26.1. A nipple 35 engages screw fashion with the socket 24.2. The arrangement is such that the passage 35.1, through nipple 35, is closed off when the nipple 35 is screwed fully home into the socket 24.2, but is in fluid flow communication with the branch passage 26.1 when the nipple 35 is less than fully screwed into the socket 24.2. The provision of this branch passage permits the bleeding of the system by conventional fashion, if necessary, until such time as a proper job of bleeding the systemm can be undertaken by making use of the method according to the invention.

Figure 5:
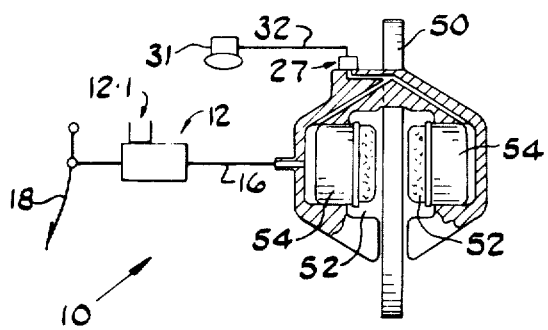
FIG. 5 shows schematically a hydraulic system for disc brakes for a vehicle, as modified according to the invention and when being bled in accordance therewith.

Referring now to FIG. 5 of the drawings, there is shown schematically, how disc brakes may be modified for bleeding in accordance with the invention. The arrangement is generally similar to that shown and described for FIG. 1. The disc 50 has two pressure pads 52 arranged on either side of it, the pads being operable by servo pistons 54 when hydraulic fluid under pressure is caused to flow from the master cylinder 12 along the hydraulic line 16 into the servo cylinders. As in the brake system shown in FIG. 1, the hydraulic connector 27 or composite hydraulic connector 24 and 27, is mounted in the system at a region which is at or near a bleed opening of the system.

By causing the passage 36.2 to lead eccentrically out of the socket 36.1 of the adaptor 36, it is possible to provide a hydraulic fluid feed passage into the cylinder 14 which can be closed off in similar fashion to the branch passage 26.1, as described in relation to the base part 24. The engaging means 27.1 of nipple 27, when screwed into the adaptor 36, and when the adaptor is screwed into the socket 14.3, can then be used with pumping of the master cylinder piston for bleeding by unscrewing the engaging means 27.1 slightly out of the socket 36.1. As soon as bleeding has taken place, the engaging means 27.1 of nipple 27 can be screwed tightly into the socket 36.1, thereby causing the end of the passage 27.2, which is then closed off by seating sealingly against the bottom of the socket 36.1. Thereafter, when a pump 31 and connecting member 30 are available, proper bleeding of the system can take place by making use of the method according in the invention.

By way of modification, the passage 14.2 may be arranged to lead eccentrically out of the bottom of the socket 14.3 in the wall of the cylinder 14. It will then be possible for the passage 26 to be closed off by screwing the engaging means 27.1 of the hydraulic connector in the form of the nipple 27, fully into the socket 14.3, or by screwing the male portion of the adaptor 36 fully into the socket 14.3. Closure of the passage 27.2 will then take place in similar fashion to that as described in relation to branch passage 26.1 and the nipple 35. Consequently, such an arrangement can also be used to provide bleeding by pumping from the master cylinder.

It is an advantage of this invention that bleeding by pumping hydraulic fluid by means of the piston in the master cylinder, is not excluded. Thus, as described, the branch passage 26.1 can be opened and closed by screwing nipple 35 out of and into its socket 24.2. Likewise, the nipple 27 can be unscrewed for bleeding if its passage 27.2 is misaligned relative to passage 14.2. It is also possible to carry out bleeding in this fashion when a hydraulic connector in the form of a nipple 27 only and without misaligned passages, is used. Bleeding is done by merely unseating the ball 34.1 while the piston of the master cylinder is pumped until as much air as possible has been expelled from the system. Unseating of the ball can take place by means of a pin, knife, pen, or pencil point. Bleeding by pumping the master piston requires the presence of two persons.

On the other hand, the method according to the invention makes it possible for a single person to bleed brakes. All he has to do is to pump enough fluid into the system or to have a long enough hydraulic fluid feed line 32 so that he can observe the reservoir of the master cylinder. He then pumps fluid through the feed passage 26 into the servo cylinder 14 and along line 16 until clear hydraulic fluid enters the reservoir of the master cylinder. The connection member 30 of the hydraulic fluid feed line 32 can then be disconnected from the nipple 27. The non-return valve 34 will ensure that no air enters the system. Furthermore, if the hydraulic fluid feed passage 26 is constituted by non-aligned sections in screw-threaded parts, then the passage can thereafter be further closed off by screwing the parts fully together.

In order to ensure that the male threaded connections make fluidtight seals, suitable washers 56 of a plastic material or of a metal such as copper of aluminum, are provided.

The pump 31 may conveniently be a reciprocating pump. In order to avoid fluid reciprocating in the fluid feed line 32, a non-return valve is provided at the delivery end of the pump 31, at the inlet to the fluid feed line 32.

What I claim is:

1. In an hydraulic system comprising a master cylinder and piston assembly, a servo cylinder and piston assembly, and a hydraulic line connecting the master cylinder to the servo cylinder for operatively conducting hydraulic fluid between the cylinders, the method of bleeding the system, which includes the steps of connecting a hydraulic fluid line to the servo cylinder, of introducing hydraulic fluid into the servo cylinder along a closable feed passage to cause flow of hydraulic fluid along the feed passage into and through the servo cylinder and along the hydraulic line to the master cylinder and of thereafter closing the feed passge at the servo cylinder, and of disconnecting the hydraulic fluid feed line from the servo cylinder.

2. A method as claimed in claim 1, wherein the introduction of the hydraulic fluid via the feed passage into the system, takes place from a hydraulic fluid feed line adapted for connection to the hydraulic system through a hydraulic connector, the method including the steps of providing a hydraulic fluid feed connecting member leading from the hydraulic fluid feed line; connecting the said connecting member to the hydraulic connector, the said connecting member defining a bleed chamber or being adapted to define a bleed chamber in co-operation with the hydraulic connector, and the bleed chamber having a closable bleed opening; feeding hydraulic fluid along the feed line until clear hydraulic fluid issues from the bleed opening; then closing the bleed opening; then introducing the hydraulic fluid into the hydraulic system via the feed passage; and then closing the feed passage.

3. A method as claimed in claim 1, in which closability of the feed passage is provided by a non-return valve.

4. A method as claimed in claim 2, in which closability of the feed passage is provided by a non-return valve in the hydraulic connector at the end remote from the servo cylinder.

5. A servo cylinder assembly adapted for use in carrying out the method as claimed in claim 1, and which includes a servo cylinder having hydraulic connecting means for connecting it operatively to a master cylinder; and a hydraulic fluid feed passage leading into the servo cylinder and having connecting means connectable to a pressurized hydraulic fluid feed line, the feed passage being provided with a non-return valve at its end remote from the servo cylinder for permitting flow of hydraulic fluid under pressure into the servo cylinder from the pressurized hydraulic fluid feed line.

6. A servo cylinder assembly as claimed in claim 5, which further includes a hydraulic connector having a screw threaded part engaging with a screw threaded socket in the servo cylinder, the hydraulic fluid feed passage being at least partly formed in the hydraulic connector, and the connecting means and non-return valve being provided in the hydraulic connector.

7. A hydraulic connector having connecting means adapted for connection to a connecting member of a pressurized hydraulic fluid feed line and having a hydraulic fluid feed passage therethrough; and which includes a non-return valve in the passage, and engaging means for engaging in such a fashion with the servo cylinder forming part of the assembly as claimed in claim 6, that the hydraulic fluid feed passage of the connector can form at least part of the closable feed passage of the servo cylinder assembly when the servo cylinder and the hydraulic connector are in assembled relationship to form the assembly as claimed in claim 6, the non-return valve being provided in a region of the passage which is adjacent the connection means.

8. A hydraulic connector as claimed in claim 7, in which there is provided a branch passage having an outlet and closing means operable to open and close the outlet, the branch passage leading out of the hydraulic fluid feed passge from a region downstream of the non-return valve.

9. A hydraulic connector as claimed in claim 7, in which there is provided a removable dust cap engaging with the connecting means, the dust cap being capable of sealingly engaging with the connecting means whereby the end of the hydraulic fluid passage is sealed off.

10. A kit comprising a hydraulic fluid feed connecting member for a hydraulic fluid feed line in combination with a hydraulic connector, as claimed in claim 7, the said connecting means of the hydraulic connector being engageable with the said connecting member, and in association therewith being adapted to define a bleed chamber having a closable bleed opening.

11. A kit as claimed in claim 10, in which the bleed opening is open when there is incomplete engagement between the connecting means of the hydraulic connector and the said connecting member, and the bleed opening is closed when there is full engagement between them.

12. A kit as claimed in claim 10, in which the said hydraulic fluid feed connecting member has a biassed pin adapted to engage with the non-return valve when there is full engagement between the hydraulic connector and the hydraulic fluid feed connecting member, thereby to bias the valve to an unseated position.

* * * * *